United States Patent [19]
Elliott, Jr.

[11] Patent Number: 5,433,858
[45] Date of Patent: Jul. 18, 1995

[54] TREATMENT OF HAZARDOUS WASTE WATER

[76] Inventor: Robert H. Elliott, Jr., 6027 Cannon Hill Rd., Fort Washington, Pa. 19034

[21] Appl. No.: 85,184

[22] Filed: Jun. 30, 1993

Related U.S. Application Data

[63] Continuation-in-part of Ser. No. 928,492, Aug. 11, 1992, abandoned, which is a continuation-in-part of Ser. No. 819,889, Jan. 13, 1992, abandoned.

[51] Int. Cl.⁶ ............................................. B01D 61/20
[52] U.S. Cl. ................................ 210/651; 210/257.1; 210/259
[58] Field of Search ............ 210/743, 651, 259, 257.1, 210/667, 669, 721, 199, 202

[56] References Cited
U.S. PATENT DOCUMENTS 3,847,804  11/1974  Pico .................................. 210/321 X
4,839,057  6/1989  White ............................ 210/257.1 X Primary Examiner—Frank Spear

[57] ABSTRACT

Treating industrial waste water to remove particulates of metals, organics, or salts so the same can be fed to a boiler or other processor by adjusting the ph of the waste water to a range of between 8.5 and 11.5 using an ultrafiltration unit or a clarifier to separate clear water and sludge and oil and deliver the clean water as needed.

2 Claims, 1 Drawing Sheet

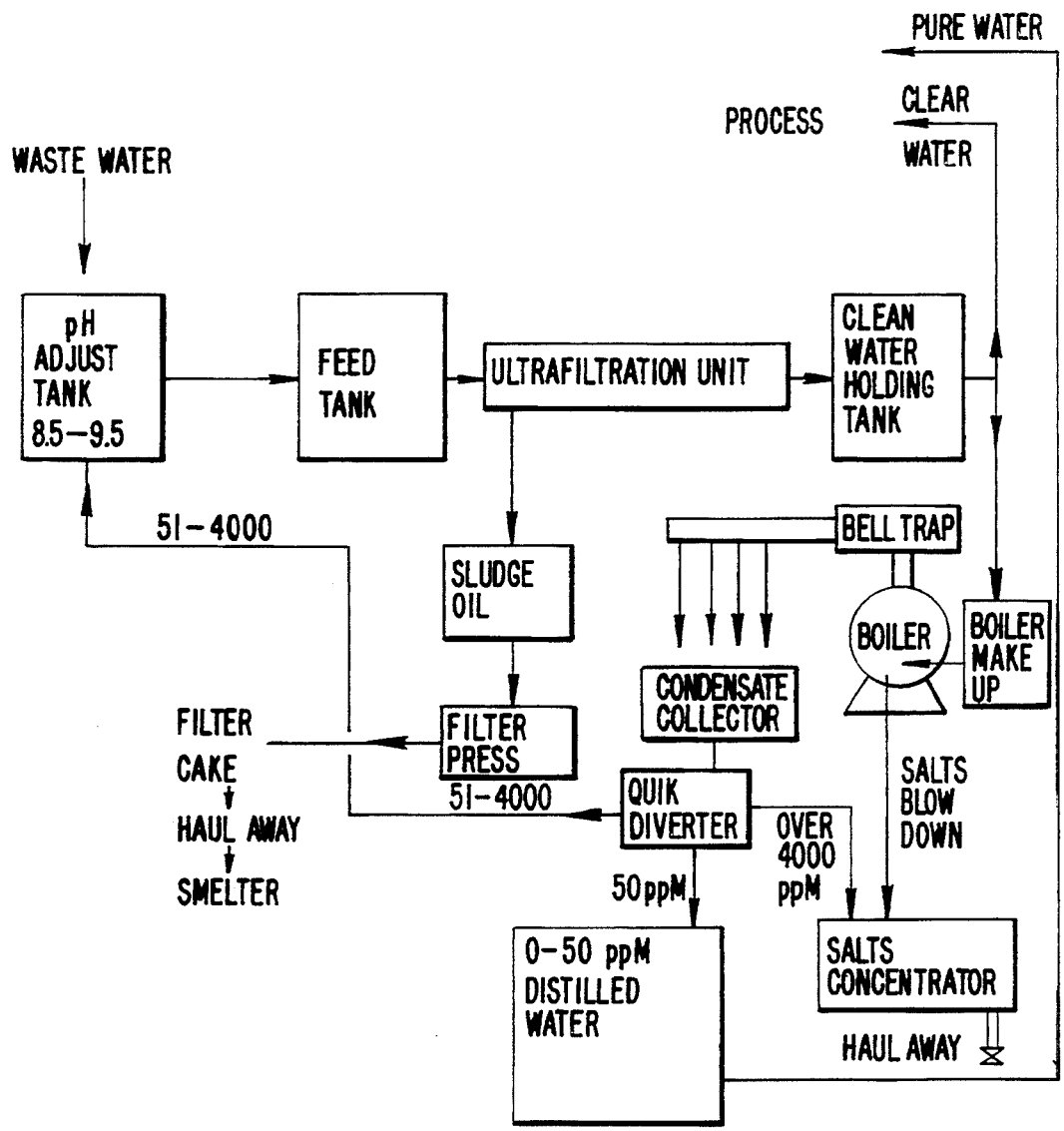
Fig_ 1
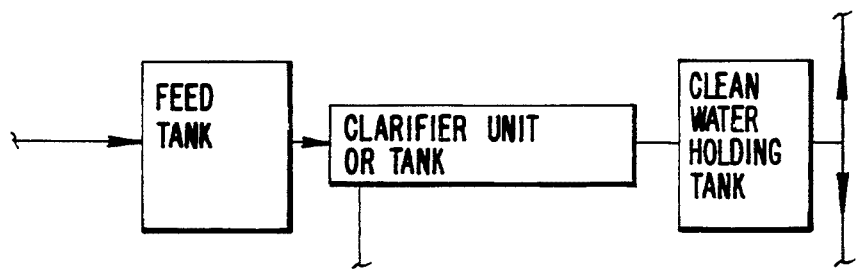
Fig_ 2

TREATMENT OF HAZARDOUS WASTE WATER

This application is a continuation-in-part of application Ser. No. 7/928,492 filed Aug. 11, 1992, now abandoned which is a continuation-in-part of application Ser. No. 7/819,889 filed Jan. 13, 1992.

This invention relates to the continuous treating of waste water from an industrial plant to achieve zero discharge in an economical manner, which, in turn, leads to zero pollution.

Scientists, engineers, medical researchers and governmental agencies realize the seriousness of our environmental dilemma and indeed we are going backwards. The United States Environmental Protection Agency offers grants to help solve the problem but the accomplishments so far are meager. Most of the waste treatment systems on the market are continuous type discharge and some are batch type discharge, whereas the permanent answer to pollution control is zero discharge; that is, a completely closed system so that no waste water, treated and untreated, leaves the manufacturing plant. The drain is cemented over and only sanitary waste goes to sewer. Most of the waste treatment systems actually add carcinogens to our dwindling pure water supply and all discharge systems add sodium.

It is obvious that the nation's health has deteriorated in the past 20 years, just as the health of the entire world is in jeopardy. It is estimated that 180 million people died of cancer in the year 1989 and it is so unnecessary. With zero pollution the carcinogens are completely contained and do not come in contact with people. The starting point for this accomplishment is an entirely closed loop for an industrial plant.

I have invented a system whereby the water is continuously recirculated and toxic organics are destroyed or collected and decomposed so that they do not build up in the closed system or escape to the atmosphere. U.S.E.P.A. refers to these carcinogens as toxic organics or TTOs (total toxic organics). These substances may be volatile and easlily removed by a specific method whereas non-volatile carcinogens may not be decomposed or rendered harmless by the first method or even a second reaction.

FIG. 1 is a flow diagram of a system incorporating the invention.

FIG. 2 is a modification of FIG. 1 showing the ultra filtration tank replaced by a clarifier unit or tank.

Before discussing the complexities of the positive destruction of carcinogens, I will review our past work whereby a batch operation was effective. In the seventies and eighties reducing a pollutant to one part per million was considered environmentally safe, but now it is realized that one part per billion is the norm and some carcinogens are considered dangerous at one part per trillion. Certain dioxins are dangerous to our health even at parts per quadrillion. In other words, it would be essentially impossible to protect the nation's health by simple methods such filtration, centrifuge, ion exchange, reverse osmosis, metal precipitation and combinations thereof and discharge to stream or sewer. Metal precipitation at a pH of 9 has been used but the more stringent limits on metals, especially such elements as cadmium, lead and mercury are not met even with clarifiers and sand filters. Fines in the order of $500,000 to $2,000,000 have resulted for companies using this approach. Even if such a system could be perfected, the more serious problems of carcinogens and sodium pass right through precipitation/filtration systems. Electrowinning takes out the majority of the metals but does nothing to remove the sodium or toxic organics. Likewise, ion exchange removes the metals but not the sodium or toxic organics and in our field application and example, a brand name ion exchange unit failed within a few months because of cadmium leakage. The sewer authority cut the electroplater's sewer line and fined the plater thousands of dollars. The plater sued the ion exchange company and they declared bankruptcy.

The plater was using ultrafiltration to remove the precipitated metals and oil. Any metals, such as copper, zinc, cadmium, lead, nickel, etc. that were still in solution would pass right through the ultrafiltration membrane. It was believed that ion exchange would remove the metals but any build up of salts, which did happen, nullified the metal removal ability. The net result was cadmium discharges in the order of two to three times the legal limit. It was believed no carcinogens were in the continuous discharge system, but analysis showed four different cancer causing agents in the discharge. The chances of these TTOs being destroyed at the sewer treatment plant are very unlikely. Dr. Adams of the Smithsonian has written that "industrial toxics can escape monitoring by being diverted into municipal sewage treatment plants, most of them incapable of chemically altering all such materials to render them harmless".

The essential principal of zero discharge is handling the three pollutants that are in the water and concentrating them economically. At the beginning of this century there were seven infectious diseases. These have been conquered by the medical world. We now have the three preventable diseases—heart, stroke and cancer. It is not likely that the medical profession alone will conquer these diseases. Total pollution prevention will play a key role. Ever increasing amounts of sodium are entering our aquifers, streams and lakes and thus contribute to hypertension and high blood pressure, which, in turn, leads to heart and stroke deaths. With zero discharge there is no sodium build-up in our dwindling water supply. Likewise, zero discharge means no carcinogens and reduced cancer deaths 20 years from now (average latency).

By combining ultrafiltration with a boiler it was possible to achieve continuous recycling. Up to the present there was no practical way to achieve zero discharge continuously. The obvious advantage was reducing the floor space requirement as manufacturing space is always considered a premium. Less obvious is operating cost reduction. The combination of ultrafiltration and ion exchange cost $600 per day and the discharge was about 20,000 gallons per day. The operating costs were cut to $150 per day with ultrafiltration and distillation. By changing some of the piping on the boiler and modifying the boiler, the daily expenses were cut to $67 per day, almost a ten to one reduction.

Another problem that had to be overcome was the boiler would build up solids and suddenly erupt and dump dissolved solids into the distilled water tank, which would normally be 10–50 parts per million. The receiving tank would climb to 5000 ppm and higher. When this material returned to the boiler, it would erupt more quickly than the first time. If all the water was diverted, the boiler would settle down, but this procedure was very expensive because truckloads of water with only one percent solids would be hauled away instead of 15–25 percent, and the price for disposal for one percent is the same as for 25 percent.

It was found that potassium permanganate and a quick acting diverter could reduce the problem. It was found that various materials could cause the sudden eruption and to complicate the boiler conditions, combinations would cause problems. For example, if calcium was present, there was no problem, but as soon as phosphates were present, the two travel through the stream lines, coating the inside walls and the combination contributed to the sudden irruptions. Certain oils and organics contribute and these in some cases are stopped by the addition of potassium permanganate without the quick acting diverter. In the case of chelates, such as sodium gluconate, ethylenediamines and nitrilotriacetate, if the concentration is kept low in the boiler with the diverter, the eruption may occur once a day, providing the diverter is quick acting. For the purpose of experimentation, the diverter was turned off and sodium gluconate injected into the boiler line. At first there was only slight eruption, but as the accumulated amount recycled to the boiler through the ultrafiltration unit, eruption became continuous. The diverter was turned on and within a half an hour the boiler settled down. The experiments were conducted at 40 psi steam pressure and repeated at 15 psi with no detectable difference. Most shops operate at 15 psi because higher steam pressures require the use of a licensed engineer, but this does not limit the invention to 15 or 40 psi. The particular boiler could go as high as 150 psi but it is my intention to adapt 600 or 800 psi boilers, such as commonly used in paper mills.

While potassium permanganate was ineffective by itself against most organics in the boiler, sodium glycolate was decomposed almost instantly by this oxidizer. Very dilute solutions of potassium permanganate should be used to prevent violent eruption.

Ultrafiltration is defined as a membrane operating at low pressure, usually in the range of 15 to 40 pounds per square inch and water will pass through as well as soluble salts. Macromolecules, such as oils, large organic molecules and precipitates will not pass through the membrane. In order to form various precipitates, the pH is adjusted to range 8.5 to 9.5 but not limited to this range. Thus, in cases of the addition of a fume scrubber to the overall system, if nitric acid fumes must be removed, it is necessary to raise the pH to 10 to 11. The overall system has the further advantage of continuous removal of the dissolved solids, such as sodium nitrate, which would build up to unacceptable levels in several days. Likewise, some metals would be more soluble at the higher pH and would recirculate in a closed system. It became obvious at this point that since the system is zero discharge, there is no chance of metals escaping to stream or sewer. Cadmium does not completely settle out and that portion that is soluble will pass through the membrane, but is completely captured by the distillation process in the boiler.

Since the boiler or boilers are used to heat the processes and building in the winter, the fuel energy for the purifying process is essentially free. In the south, many companies use steam to run their air conditioning by steam turbines at 150 psi and higher. The steam exhaust at about 15 psi to run chemical processing and in cases where electricity is used to heat, the costs for steam are about one third the costs for electricity; the condensate is returned to a collection tank to be used for rinsing or chemical bath make-up as high quality distilled water.

It was found that not only could potassium permanganate be added directly to the boiler but also before the ultrafiltration membranes. For some unknown reason, the membranes failed prematurely. One possible answer is that chelates are used for electroless nickel solutions. It is difficult to plate out the nickel at low concentrations but I have found that sodium or potassium permanganate will effectively decompose the solution and the nickel falls out as a precipitate instead of plating out on the membrane. The potassium salts are preferred and the range is 0.1 to 1.0 percent but can be as low as 0.001 percent depending on the organics present. In cases where only the organics are to be treated on a batch basis, the permanganate concentration can be as high 5 to 10 percent. Caution must be exercised as the reaction can be very violent and the permanganate should be dissolved in cold water first and added slowly. Once the metal (nickel) is out of the electroloss bath there is little chance for it to plate out and the ultrafiltration membrane will do its proper job of filtering.

There are other baths where metals can be plated out without electricity such as copper, zinc, cobalt etc. However, nickel is by far the most common and the permanganate solution will cause the metals to drop out so that they will not effect the boiler or the filtration system.

A further advantage of permanganate is it is a strong oxidizing agent on the alkaline side and can be used in a boiler which is plain steel.

Not all organics can be destroyed with permanganate and hydrogen peroxide can be used. However, mild steel in a boiler is rapidly attacked by hydrogen peroxide and it is not practical to use stainless steel. Organic volatiles escape from the boiler with the steam such as aromatics. Benzene, toluene and xylene are three common compounds but there are many others including chlorinated organics. If these leave the boiler in the steam, they will still be present in the condensate. When the condensate cools to 160 degrees F., hydrogen peroxide is pumped into a continuous stainless steel reactor (tube) and a pressure of 1000 to 2000 psi for one minute. The stainless tube should be long enough to handle the volume for a retention time of one to two minutes. The preferred time is one minute or less. I have found that while this is effective for decomposing organic compounds in fairly pure condensate, it also removes the dioxins and lignins in paper pulp.

Normally pulp in a paper mill is digested for 8 to 12 hours but at 50 to 200 seconds, the savings are substantial. I believe that the high pressure and low temperature keeps the hydrogen peroxide in contact with the compounds and at the same time does not destroy the paper fibers. For example, pulp cooked at 500 degrees F. and 700 psi will in five minutes give the necessary whiteness but generally weakens the fibers. The paper will be about 15 percent of the expected strength whereas 2000 psi at 140 degrees–160 degrees F. for one minute gives excellent strength and whiteness to the finished paper. The preferred range is 140 degrees–160 degrees F. but 160 degrees–180 degrees F. can be used as well as higher or lower temperatures and appropriable increases or decreases the time. The preferred pH range is 8 to 10 but acid conditions can be used if close attention is paid to the metals in contact with pulp. Concentration of pulp is normally 8 to 21 percent with the preferred range of 15–18 percent by weight and the hydrogen peroxide at 1 percent of the dry weight of the pulp with a range of 0.1 to 3 percent hydrogen peroxide.

Of course, in the case of steam condensate containing organics it is necessary to hit the toxics with whatever combination will decompose the organics without concern for the weakening paper fibers.

Quick acting divertor for "Quik-Vert" is an important instrument for back up for this waste treatment invention. If anything goes past the ultrafiltration unit or any other device to stop metal sludges, oils, chelates, calcium, manganese etc. from entering the boiler, the divertor will act to divert the material from entering the boiler a second time. For example: oil by itself will cause the boiler to erupt and throw dissolved solids into the steam exhaust which becomes condensate with a high solids content (5000 ppm or more). The "Quik-Vert" will detect the high solid by conductivity and instantly shunt the condensate through the salts concentrator so that the oil cannot enter back into the closed system. If the oil should reenter the boiler, it will cause a more severe eruption than the first time.

If the permanganate, which acts as a strong oxidizing agent on the alkaline side (ph 8-12) in the boiler, does not decompose particular organic, the "Quik-Vert" will divert the condensate to the salts concentrator where it cannot enter the waste treatment system again. The divertor instrument is adjustable, for example, the instrument is usually set at 50 ppm of dissolved solids and this has been found acceptable for recycling. If something comes through 200 ppm this can go back to the waste treatment system and the contaminates will probably be destroyed the second time through. If the solids are over 2000 ppm these will cause considerable eruption of the boiler and therefore diverted to the salts concentrator which never enters back into the system and the main purpose of the salts concentrator is to take the blowdown from the boiler when it reaches 150,000 ppm which is 15% by weight of salts such as sodium chloride and/or sodium sulphate.

I will now comment on the units indicated by the boxes in FIG. 1.

Waste Water

Waste water simply rinses from any plant. It might be 10 gallons per minute or thousands of gallons per minute, such as a paper mill. In addition to rinse water, there are chemical dumps from process lines. One process line may have 5 or 10 different chemical baths and the chemicals are not compatible with the next step in the process and therefore, the rinsing must be effective. When the baths are dumped into a big tank (feed tank), there must be sufficient rinse water to dilute the chemical dump.

Adjust Tank

The pH has to be adjusted to 8.5 to 9.5 to precipitate the metals for the ultrafiltration unit to work. The feed tank works in conjunction with the adjust tank. It could be one tank but it is better to use two tanks. Routine for most of the waste water treatment system on the market.

Feed Tank

This tank is to even out flow and check again that the pH is between 8.5-9.5. It also takes care of surges. Waste water might run 100 gal/min for short time and ultrafiltration might run at only ½ that flow rate.

Clean Water Holding Tank

This tank is usually 30,000 gallons to 100,000 gallons and maybe ¼ to ¾ full depending on demand—evens out the flow to process line (6000 parts per million of dissolved solids) and to boiler. Water goes to boiler make-up tank which in turn pumps water into boiler as the boiler calls for water.

Sludge—Oil

Sludge is nickel hydroxide, copper hydroxide, zinc hydroxide. Oil is machine oils, rust preventatives, mineral oil etc. The ultrafiltration continuously removes large molecules such as sludge and oil. Salt ions are in tank solution and thru the membrane.

Filter Press

This press is any press which stops or filters the large molecules 3'×3' by 1"-2" thick. Pressed at high pressure to remove water—50 percent moisture.

Boiler

The boiler is a device to generate steam in plant—most are 15 psi, then 16-150 psi. The higher pressure boiler is about 50% more money for the same H.P. and the higher pressure requires a licensed engineer.

Bell Trap

This is our invention shown in pat. 4,892,591.

Salt Concentrator

This takes 150,000 ppm from boiler (blowdown) and concentrates to 300,000 ppm or 30 percent in salt concentrator.

Condensate Collector

This is various steam pipes after steam traps being collected at the final tank. If a leak occurs it is possible to detect which line and quickly repair it.

Quik-Vert

This is the quick acting diverter to place distilled water in the right tank. 0-50, 51-4000, or over 4000 ppm. Works on conductivity.

Distilled Water

This is simply the steam condensate. Most applications will give us 10-30 ppm.

Salts Blowdown

This is the blow down from boiler. Salts are in true solution and not sludge.

Boiler Make-Up

This is the water going in to make-up for evaporation or generation of steam.

Another approach is to replace the ultrafiltration with a tank about 100 feet long and 25 feet wide. The tank would hold about. 300,000 gallons of waste water. This would give sufficient time for the metals to settle to the bottom and the oil float to the top to be removed in the clean water holding tank.

This method has the advantage of separating the metal sludge from the oil whereas, in the ultrafiltration method, the two hazardous waste are removed together. A further advantage is the large tank gives time for the metals to settle without large pumps, such as in the ultrafiltration method. It would take about four ultrafiltration units with 75 N.P. pumps to handle the volume to separate the oil and sludge by filtration. On the other hand the large tank or clarifier would require about 20 H.P. The reason for less energy is the head for the settling tank is 10 feet and the head for the ultrafiltration is about 120 feet. Conservation of energy is a very important part of modern pollution control. Electric utilities have paid us $5000 to $10,000 for preliminary pilot work for some of the corporate 500 companies, as part of D.O.E. strategy to save electricity and shift peak loads to off peak times, such as weekends. Still another advantage is the labor savings of cleaning the settling tank. The bottom is sloped and the metal sludge is pumped,continuously to the filter press. If the sludge load is light, the filter press can run intermittently. The ultrafiltration unit usually requires cleaning every weekend because of the heavy sludge load.

The idea of removing metal sludge and organics before entering the company boiler or boilers is not limited to 2 million gallons per day and it is intended to work on 10 and 15 million gallon discharges and bring them to zero. This is B.A.T. (EPA acronym for the Best Available Technology economically achievable)

With the Ultrafiltration Tank of FIG. 1 removed, the Clarifier Unit or Tank is located as shown in FIG. 2 between the Feed Tank and the Clean Water Holding Tank.

I claim:

1. The method of treating hazardous waster water characterized by having singly or in combination particulates of metals, organics or salts comprising the steps of:
   providing an adjust tank to receive waste water and adjusting the pH in a range between 8.5 and 9.5 and to discharge the waste water;
   providing a feed tank receiving said waste water discharged from said adjust tank and checking that the pH of the received water is between 8.5 and 9.5 and if not within that range to adjust the same and discharging waste water with said pH range at a predetermined rate;
   providing an ultra-filtration unit to receive maid discharge from said feed tank and to (a) remove large molecules such as sludge and oil and discharge same and (b) to discharge the clear or filtered water to a holding tank;
   providing a boiler make up tank to receive water from said holding tank and to discharge the filtered water to a boiler on demand;
   providing a filter press to receive said large molecules such as sludge and oil and remove substantially 50% of the moisture therein and conditioning the residue for hauling away;
   providing means to receive steam from a boiler and remove particulate and dissolved particles and to discharge the filtered steam via a plurality of streams;
   providing a condensate collector to receive each of said streams of steam and to, discharge the collected steam via a single stream;
   providing a quick-vent device to receive said single stream of steam and provide discharges of 0–50 ppm, and 51–4000 ppm, and over 4000 ppm;
   providing for the 51–4000 ppm discharge to enter said adjust tank with said waste water;
   providing for the 0–50 ppm discharge to be stored and used as distilled or pure water; and
   providing a salts concentrator to receive salts blowdown from a boiler and to receive said discharge having over 4000 ppm and conditioning same to be hauled away.

2. In a method of treating hazardous waste water, the steps of:
   providing an adjust tank to receive waste water and adjusting the pH in a range between 8.5 and 9.5 and to discharge the waste water;
   providing means to receive steam from a boiler and remove particulate and dissolved particles and to discharge the filtered steam via a plurality of streams;
   providing a condensate collector to receive each of said streams of steam and to discharge the collected steam via a single stream;
   providing a quick-vent device to receive said single stream of steam and provide discharges of 0–50 ppm, and 51–4000 ppm, and over 4000 ppm;
   providing for the 0–50 ppm discharge to be stored and used as distilled or pure water;
   providing for the 51–4000 ppm discharge to enter said adjust tank with said waste water; and
   providing a salts concentrator to receive salts blowdown from a boiler and to receive said discharge having over 4000 ppm and conditioning same to be hauled away.

* * * * *